UNITED STATES PATENT OFFICE.

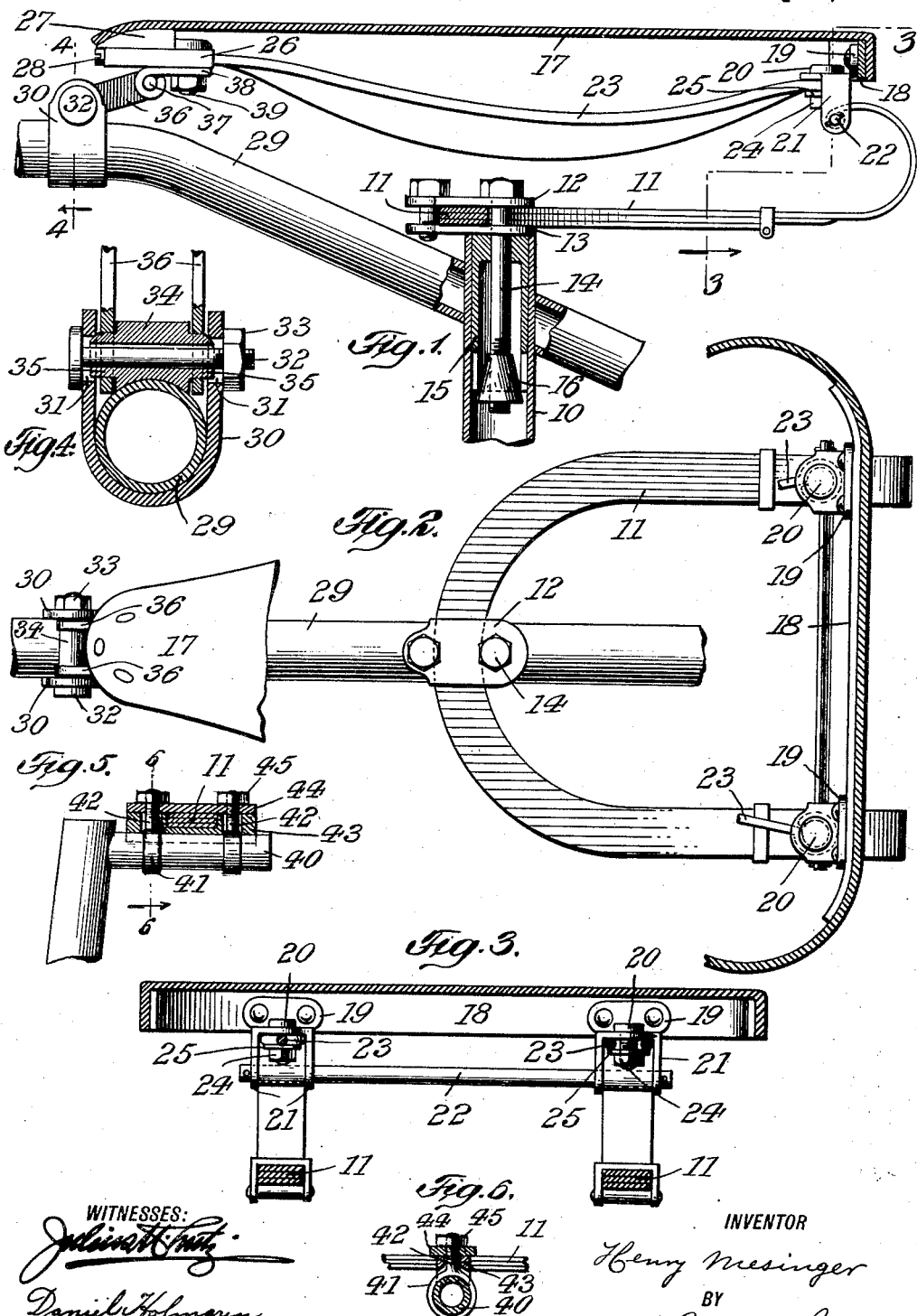

HENRY MESINGER, OF NEW YORK, N. Y.

SADDLE FOR MOTOR-CYCLES.

1,037,287.　　　　　Specification of Letters Patent.　　Patented Sept. 3, 1912.

Application filed February 12, 1912. Serial No. 677,036.

*To all whom it may concern:*

Be it known that I, HENRY MESINGER, a citizen of the United States, residing at New York city, county and State of New York, have invented a new and Improved Saddle for Motor-Cycles, of which the following is a specification.

This invention relates to a saddle for motor-cycles and similar articles, which is of simple construction, possesses superior resiliency and is mounted at a minimum elevation above the frame, so that the rider's feet may readily reach the ground.

In the accompanying drawing: Figure 1 is a side elevation partly in section of a saddle embodying my invention; Fig. 2 a plan with the saddle top removed and some of the parts broken away; Fig. 3 a cross section on line 3—3, Fig. 1; Fig. 4 a cross section on line 4—4, Fig. 1; Fig. 5 a detail showing the device applied to a goose neck saddle post, and Fig. 6 a cross section on line 6—6, Fig. 5.

To the saddle post 10 is secured a cradle spring 11 made of the peculiar shape more fully shown in Figs. 1 and 2. That is to say the spring is of U-shape in plan, with its two shanks coiled upwardly and forwardly at their free ends. The body of the spring may be composed of a number of superposed leaves at its forward or horizontally curved portion, while its rear or vertically curved portions may be composed of a single leaf only. Means are provided for securing the spring at its center to post 10, such means comprising for example upper and lower clamp plates 12, 13 connected by an expansion bolt 14 that extends into a slitted sleeve 15 or post 10 and carries a coniform nut 16. The rear ends of spring 11 are connected to the back of the saddle top 17 by means of a cantle 18 to which a pair of flanged lugs 19 are riveted. Each of these lugs is apertured for the reception of a depending bolt 20 arranged between the cheeks of a yoke 21 depending from lug 19. Through these cheeks passes a common horizontal pin 22, which thus bridges the yokes, and around which the two shanks of spring 11 are coiled, each of said shanks being accommodated within one of the yokes. The saddle is provided with two stay springs 23, each coiled at its rear end around one of the bolts 20, within the upper portion of yoke 21, such bolt carrying a nut 24 and washer 25 which supports the stay spring. The front ends of the stay springs are secured to a plate 26 adjustably connected to the nose piece 27 by set screw 28. Plate 26 is so secured to the cycle frame 29 that a free play at the forward ends of springs 23 is insured and that at the same time the play may be accurately regulated. For this purpose frame 29 is straddled by a flexible strap 30 which is apertured as at 31 for the accommodation of a bolt 32 carrying nut 33. This bolt passes through a cylindrical sleeve 34 which is partly concaved to closely hug frame 29. The two ends of sleeve 34 are reduced as at 35 for the seating of the apertured forward ends of a pair of links 36, the rear ends of which are pivoted at 37 to an eyed member 38 bolted to plate 26 at 39. The two reduced ends 35 of sleeve 34 are beveled at their outer edges and these reduced and beveled ends project into the eyes 31 of strap 30. It will be seen that links 36 permit a free play of the stay spring, so that great resiliency at the front of the saddle is insured. By tightening up nut 33 to crowd eyes 31 of strap 30 over beveled ends 35 of sleeve 34 the concaved section of said sleeve is forced against the cycle frame, so that the sleeve is securely clamped in position.

In Figs. 5 and 6 the cradle spring is shown to be secured to a goose neck saddle post. Here the lateral arm 40 of the post is embraced by a pair of eye bolts 41, the shanks 42 of which pass upwardly through an apertured bottom plate 43 having a lower concave side that snugly fits the post. Intermediate bolts 41, plate 43 is recessed to seat the cradle spring 11, which is covered by an apertured top plate 44 held in place by nuts 45 carried by the bolts.

I claim:

1. A saddle provided with a cradle spring which is U-shaped in plan with coiled ends, a saddle post, means for securing the spring at its center to said post, a saddle top, and means for securing the spring at its coiled ends to said top.

2. A saddle provided with a saddle top, a cantle secured thereto, a pair of yokes connected to the cantle, a pin hung in the yokes, and a U-shaped cradle spring having upwardly coiled ends that are received within the yokes and are connected to the pin.

3. A saddle provided with a saddle top, a cantle secured thereto, apertured yokes riveted to the cantle, bolts projecting into the yokes, a pin hung in the yokes, a U-shaped cradle spring having upwardly coiled ends that are received within the yokes and are connected to the pin, and a pair of stay springs engaging the bolts.

4. A saddle provided with a stay spring, a plate to which the forward end of said spring is attached, a fixed support, and a link connection that pivotally connects said plate to said support.

5. A saddle provided with a stay spring, a plate to which the forward end of said spring is attached, a fixed support, a sleeve engaging the same, a pair of links that pivotally connect said plate to said sleeve, and means for clamping the sleeve to said support.

6. A saddle provided with a stay spring, a plate to which the forward end of said spring is attached, a fixed support, a strap fitted thereon, a bolt engaging the strap, a tubular sleeve encompassing the bolt, and a pair of links mounted on the sleeve and pivotally connected to the plate.

7. A saddle provided with a stay spring, a plate to which the forward end of said spring is attached, a fixed support, an apertured strap fitted thereon, a bolt engaging the strap, a tubular sleeve encompassing the bolt and having reduced and beveled ends adapted to engage the strap-apertures, and a pair of links mounted on said ends and pivotally connected to the plate.

3. A saddle provided with a stay spring, a plate to which the forward end of said spring is attached, a fixed support, an apertured strap fitted thereon, a bolt engaging the strap, a tubular sleeve encompassing the bolt, said sleeve being provided with a concave section adapted to engage the fixed support, and with a pair of reduced and beveled ends adapted to engage the strap-apertures, and a pair of links mounted on said ends and pivotally connected to the plate.

9. A saddle provided with a post, a U-shaped cradle spring secured thereto and having upwardly coiled ends, a pair of stay springs, a plate to which the forward ends of said stay springs are secured, a pair of links pivotally connecting said plate to a fixed support, a cantle, and means for connecting the rear ends of the cradle spring and of the stay springs to said cantle.

HENRY MESINGER.

Witnesses:
FRANK V. BRIESEN,
KATHERYNE KOCH.